INVENTORS
DOUWE M. DE BOER
WILLEM F. BOSMAN
JACQUES J. H. CROYMANS
HARM KREUTZELMAN

BY *Frank R. Trifari*

AGENT

United States Patent Office 3,453,465
Patented July 1, 1969

3,453,465
ROTARY STEPPING MOTOR WITH
MOTION DAMPER
Douwe Mindert De Boer and Willem Frederik Bosman, Hilversum, and Jacques Johannes Hendrik Croymans and Harm Kreutzelman, Emmasingel, Eindhoven, Netherlands, assignors, by mesne assignments, to U.S. Philips Corporation, New York, N.Y., a corporation of Delaware
Filed Nov. 7, 1966, Ser. No. 592,463
Claims priority, application Netherlands, Dec. 22, 1965, 16,685
Int. Cl. H02k 37/00, 1/22, 7/02
U.S. Cl. 310—49                                    4 Claims

ABSTRACT OF THE DISCLOSURE

An inertia member is rotatably coupled on the shaft of a motor, for example a rotary stepping motor, so as to permit slippage therebetween to dampen oscillations which occur when the motor is frequently stopped. The amount of slippage is frictionally controlled by adjustment of the relative positions of the ball-bearings and races within the coupling by means of a nut threaded on the motor shaft.

---

Figure 1:
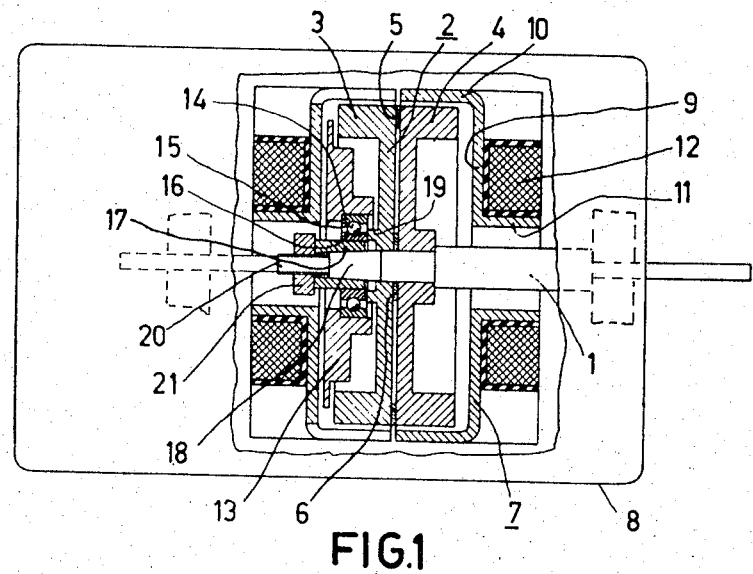

This invention relates to the field of motion damping, in particular to inertia members or discs used in connection with rotary motors such as stepping motors. The purpose of such inertia members is to control and prevent the oscillations which tend to occur during the intermittent stop and start operation characteristic of such motors.

The prior art has shown an inertia member placed in a frictional drive relationship with the rotor of a stepping motor by pressing their surfaces together as by means of a spring. However, certain inherent disadvantages are present in such a friction coupling arrangement, namely the coupling radiates undesirable heat energy and it is difficult to maintain a constant frictional adjustment of the inertia member and the rotor due to the variables such as ambient temperature, humidity, or foreign material on the frictional surfaces, all of which will influence the coefficient of friction.

These difficulties are completely avoided according to the present invention, wherein the frictional coupling is solely established by rolling friction. In the case of rolling friction, mechanical energy is not converted into heat due to relative movements between surfaces pressing on each other, but due to deformation of the material of the roller and the running surfaces on which the roller moves. Consequently, the coefficient of friction depends solely on the properties of the materials of roller and running surface, particularly on the elasticity constants. These properties cannot be influenced externally, except to a very small extent by temperature. Rolling friction may be achieved in various ways, for example, by causing balls or needles to run in a liquid of high viscosity, such as thick oil. A simple form of rolling friction is obtained, however, if according to a further aspect of the invention, the coupling consists of a ball-bearing the outer ball-race of which is rigidly connected to the inertia disc and the inner ball-race of which is rigidly secured to the rotor shaft, and the coupling is mechanically loaded in radial direction by a pressure force directed towards the inertia disc. This may be accomplished in a simple and adjustable manner if, according to a further aspect of the invention, there is provided between the inner ball-race and the shaft a conical clamping sleeve which can be axially displaced on the shaft by a nut co-operating with a screw-thread on the shaft.

Figure 2:
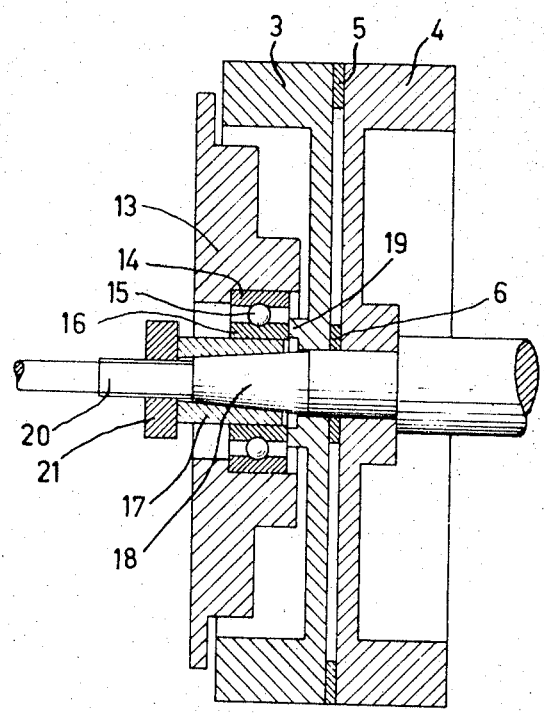

The invention will now be described more fully with reference to the drawing which shows an embodiment of the invention and in which:

FIGURE 1 is a front elevation of a synchronous stepping motor in which part of the envelope is removed and the inner parts are shown in a sectional view taken on a plane passing through the centre line of the shaft, and FIGURE 2 shows on an enlarged scale a round disc of FIGURE 1 which is connected with the shaft by means of a ball-friction coupling.

In the figures, reference numeral 1 denotes a shaft on which there is provided a rotor 2 consisting of two parts 3 and 4 interconnected by means of plates 5 and 6 of synthetic resin. The rotor parts are made of sintered oxidic ferromagnetic material such as Ferroxdure. On either side of the rotor, provision is made for stators 7 which are fixedly arranged in a housing 8 in a manner not shown and which consist of plates 9 and of poles 10 connected thereto. The stator plates 9 have secured to them sleeves 11 surrounded by stator coils 12.

A round inertia disc 13 is positioned adjacent the rotor part 3. An outer race 14 of a ball-bearing coupling, having ball-bearings 15, is inserted in disc 13 with a tight fit. An inner race 16 of the coupling is positioned adjacent the sleeve 17, having a conical bore, the sleeve is slipped over the tapered portion 18 of the shaft 1 and is in a mating relationship therewith. The inner race 16 engages a boss 19 of the rotor part 3. The shaft 1 has a threaded portion 20 which is engaged by a nut 21.

When nut 21 is tightened, the sleeve 17 is displaced along the tapered portion 18 of the shaft and thus expands radially so that it exerts a radial pressure on the inner race 16 of the ball-bearing coupling. This pressure on the inner race 16 causes the latter to expand radially so that the balls 15 can no longer rotate freely but meet with a given resistance which will depend upon the extent of the radial expansion of the inner race 16. Friction in the coupling occurs only in the ball-races 14 and 16 which rotate in relation to each other. It will be appreciated that any oscillations of the rotor when the motor is stopped are thus dampened.

The choice of the moment of inertia of the inertia member or disc 13 and the magnitude of the friction in the ball-bearing coupling must be determined for each individual case. These parameters being suitably adjusted, a considerable improvement in the behavior at high frequencies of the stepping motor can be obtained. In a practical embodiment of a stepping motor according to the present invention, the frequency at which the motor stops could be increased from 400 c./s. to more than 1100 c./s. by using an inertia member 13, having a moment of inertia of 3000 g./mm.$^2$ and a frictional torque of 10 g./cm.

The described device in accordance with the invention further has the advantage that when the rotor is stationary there is no significant frictional moment that might impede the starting of the motor. Furthermore, the amount of wear of the device is considerably smaller than with a mechanical device for damping vibrations based on normal friction.

What is claimed is:

1. The combination of a stepping motor including:
a stator coil having a plurality of poles,
a shaft,
a rotor mounted on said shaft for movement between said poles,
an inertia member rotatably mounted on said shaft for damping oscillations of the rotor when the motor is stopped, wherein the improvement comprises:
a frictional coupling means for rotatably mounting the inertia member on the shaft, a sleeve portion for said coupling means positioned around the shaft, a roller portion in said coupling means positioned between said sleeve and said inertia member, and adjustment means cooperating with said sleeve portion and said shaft for applying varying degrees of radial pressure on the roller portion of the frictional coupling means.

2. The apparatus as claimed in claim 1 wherein the roller portion comprises:

an inner race secured to said inertia member, an outer race secured to said sleeve, and a ball-bearing positioned between said inner and outer races.

3. The apparatus of claim 2, further comprising:

a tapered portion on said shaft, and a conical bore through said sleeve wherein said sleeve will fit in mating relationship over the tapered portion of the shaft.

4. The apparatus of claim 3 wherein the means for applying the radial pressure comprises:

a nut threadably attached to said shaft and positioned with respect to the sleeve so that a tightening of the nut will displace the sleeve toward the larger portion of the taper on the shaft, with a resultant radial expansion of the inner race.

References Cited

UNITED STATES PATENTS

| | | | |
|---|---|---|---|
| 2,793,306 | 5/1957 | Bolech | 310—77 |
| 3,193,713 | 7/1965 | Larson et al. | 310—74 X |
| 3,197,659 | 7/1965 | Marshall | 310—49 |

OTHER REFERENCES

German Printed Application 1,125,066, Mar. 8, 1962.

WARREN E. RAY, *Primary Examiner.*

U.S. Cl. X.R.

310—74, 77, 90, 268

PO-1050
(5/69)

UNITED STATES PATENT OFFICE
CERTIFICATE OF CORRECTION

Patent No. 3,453,465      Dated     August 1, 1969

Inventor(s) DOUWE MINDERT DE BOER ET AL

It is certified that error appears in the above-identified patent and that said Letters Patent are hereby corrected as shown below:

Col. 1, line 11, "16,685" should read --6516685--

Signed and sealed this 2nd day of Dec. 1969.

(SEAL)
Attest:

Edward M. Fletcher, Jr.
Attesting Officer

WILLIAM E. SCHUYLER, JR.
Commissioner of Patents